(12) United States Patent
Crandell et al.

(10) Patent No.: US 8,800,275 B2
(45) Date of Patent: Aug. 12, 2014

(54) MOUNTING ASSEMBLY FOR A REDUCTANT INJECTOR

(75) Inventors: Richard Anderson Crandell, Peoria, IL (US); Jinhui Sun, Dunlap, IL (US); Yong Yi, Dunlap, IL (US); Zhi Huang, Salt Lake City, UT (US); Matthew Fahrenkrug, Chillicothe, IL (US); James E. Webster, III, East Peoria, IL (US); Michael Max Blanco, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 250 days.

(21) Appl. No.: 13/405,934

(22) Filed: Feb. 27, 2012

(65) Prior Publication Data

US 2013/0219871 A1    Aug. 29, 2013

(51) Int. Cl.
*F01N 3/00* (2006.01)
*F01N 3/10* (2006.01)
*F01N 1/00* (2006.01)

(52) U.S. Cl.
USPC ............. 60/303; 60/295; 60/301; 60/324

(58) Field of Classification Search
USPC ............ 60/286, 295, 301, 303, 311, 324
See application file for complete search history.

(56) References Cited

U.S. PATENT DOCUMENTS

| 5,605,042 | A | 2/1997 | Stutzenberger |
| 6,048,510 | A | 4/2000 | Zauderer |
| 6,513,323 | B1 | 2/2003 | Weigl et al. |
| 6,814,303 | B2 * | 11/2004 | Edgar et al. ............... 239/128 |
| 7,500,356 | B2 | 3/2009 | Hirata et al. |
| 7,971,428 | B2 | 7/2011 | Kimura et al. |
| 2008/0155973 | A1 | 7/2008 | Maruyama et al. |
| 2009/0092525 | A1 | 4/2009 | Ichikawa |
| 2010/0132344 | A1 | 6/2010 | Peters |
| 2010/0146951 | A1 | 6/2010 | Gaudin et al. |
| 2010/0212292 | A1 | 8/2010 | Rusch et al. |
| 2010/0300072 | A1 * | 12/2010 | Alizon et al. ............... 60/280 |
| 2011/0079003 | A1 | 4/2011 | Sun et al. |
| 2011/0095105 | A1 | 4/2011 | Mortensen et al. |
| 2011/0126529 | A1 | 6/2011 | Park |
| 2012/0227390 | A1 * | 9/2012 | Wikaryasz et al. ......... 60/324 |

FOREIGN PATENT DOCUMENTS

| DE | 102004048075 | 4/2006 |
| DE | 102006003786 | 4/2007 |
| JP | 2005214100 | 8/2005 |
| WO | WO 2008/050009 | 5/2008 |
| WO | 2008121319 | 10/2008 |
| WO | WO 2009/071088 | 6/2009 |
| WO | 2011030064 | 3/2011 |

* cited by examiner

*Primary Examiner* — Audrey K Bradley
(74) *Attorney, Agent, or Firm* — Miller, Matthias & Hull (57) ABSTRACT

A mounting assembly for an injector is located in a curved portion of an exhaust line having an exhaust flow from an upstream end to a downstream end. The mounting assembly includes an indent extending at least partially into the exhaust line curved portion and disposed in the exhaust flow. The downstream wall has an interior surface oriented to substantially face the exhaust line downstream end. A recess extends from the downstream wall in a direction away from the exhaust line downstream end, and a recess aperture is formed in the recess and configured to fluidly communicate with the injector. The recess reduces the amount of exhaust heat reaching the injector tip.

18 Claims, 8 Drawing Sheets

MOUNTING ASSEMBLY FOR A REDUCTANT INJECTOR

TECHNICAL FIELD

The present disclosure generally relates to engine exhaust aftertreatment systems, and more particularly to mounting assemblies for reductant injectors.

BACKGROUND

A selective catalytic reduction (SCR) system may be used in an exhaust treatment or aftertreatment system to remove or reduce nitrous oxide (NOx or NO) emissions coming from the exhaust of an engine. SCR systems often include an injector for spraying a reductant, such as urea, into the exhaust flow.

The injector is typically positioned to spray the reductant toward a center of the exhaust flow, so that the reductant is sufficiently mixed with the exhaust flow and does not impact the walls of the exhaust piping. In certain exhaust pipe configurations, it may be advantageous to locate the injector within the exhaust pipe envelope in order to direct the reductant along the desired path. U.S. Patent Application Publication No. 2011/0079003 to Sun et al., for example, discloses an indentation mount for a reductant injector that can be used with a curved exhaust pipe. An indentation is provided that projects into the exhaust pipe. The indentation includes a wall capable of supporting the injector at an orientation that will produce a reductant flow stream in the desired direction.

While the indentation disclosed by Sun et al. allows the injector to be located in a desirable position inside the exhaust pipe envelope, the injector is more directly subjected to the high temperatures of the exhaust flow. Mounting the tip flush with the indent plate, as shown in Sun et al., may boil the reductant and form deposits in the tip that restrict reductant flow. In addition, the higher heat environment inside the exhaust pipe envelope may adversely affect components of the injector made from materials rated for lower temperatures. Recessing the tip away from the exhaust flow, as shown in U.S. Pat. No. 7,971,428 to Kimura et al., may mitigate exposure of the injector to higher temperatures, but may also introduce a recirculation flow that directs droplets of reductant back toward the tip which again may form deposits that block the injector nozzle.

SUMMARY OF THE DISCLOSURE

In accordance with one aspect of the disclosure, an injector mounting assembly is provided for use with an injector that is configured for mounting in a curved portion of an exhaust line having an exhaust flow from an upstream end to a downstream end. The injector mounting assembly includes an upstream wall extending at least partially into the exhaust line curved portion and disposed in the exhaust flow, and a downstream wall coupled to and located downstream of the upstream wall, the downstream wall extending at least partially into the exhaust line curved portion and disposed in the exhaust flow, the downstream wall having an interior surface oriented to substantially face the exhaust line downstream end. A recess extends from the downstream wall in a direction away from the exhaust line downstream end, and a recess aperture is formed in the recess and configured to fluidly communicate with the injector.

In another aspect of the disclosure that may be combined with any of these aspects, an engine exhaust assembly is provided that includes a curved exhaust line having an exhaust flow from an upstream end to a downstream end. A mounting assembly includes an upstream wall extending at least partially into the exhaust line and is disposed in the exhaust flow, and a downstream wall coupled to and located downstream of the upstream wall, the downstream wall extending at least partially into the exhaust line and disposed in the exhaust flow, the downstream wall having an interior surface oriented to substantially face the exhaust line downstream end and an exterior surface facing substantially away from the exhaust line downstream end. A recess extends from the downstream wall in a direction away from the exhaust line downstream end, and a recess aperture is formed in the recess. An injector is coupled to the downstream wall exterior surface and has a nozzle aligned with the recess aperture.

In another aspect of the disclosure that may be combined with any of these aspects, an engine exhaust assembly is provided having a curved exhaust line having an exhaust flow from an upstream end to a downstream end. An indentation includes an upstream wall extending at least partially into the exhaust line curved portion and disposed in the exhaust flow, and a downstream wall formed integrally with and located downstream of the upstream wall, the downstream wall extending at least partially into the exhaust line curved portion and disposed in the exhaust flow, the downstream wall having an interior surface oriented to substantially face the exhaust line downstream end and an exterior surface facing substantially away from the exhaust line downstream end. A recess is formed integrally with the downstream wall and extends from the downstream wall in a direction away from the exhaust line downstream end, and a recess aperture is formed in the recess. An injector is coupled to the downstream wall exterior surface and has a nozzle aligned with the recess aperture.

In another aspect of the disclosure that may be combined with any of these aspects, the recess includes an outer periphery having a substantially obround shape.

In another aspect of the disclosure that may be combined with any of these aspects, the exhaust line further includes a straight portion coupled to the curved portion downstream end and defines a straight portion centerline, and the recess aperture defines a recess centerline oriented at an angle relative to the straight portion centerline.

In another aspect of the disclosure that may be combined with any of these aspects, the injector includes a plurality of feet, and the downstream wall includes a plurality of bosses, wherein each boss extends toward an associated foot.

In another aspect of the disclosure that may be combined with any of these aspects, a gasket is disposed between the plurality of feet and the plurality of bosses.

In another aspect of the disclosure that may be combined with any of these aspects, the gasket includes a fastener aperture for each injector foot and a gasket aperture substantially aligned with the recess aperture.

In another aspect of the disclosure that may be combined with any of these aspects, the upstream wall defines an exterior surface and the downstream wall defines an exterior surface, the injector mounting assembly further including a layer of insulation configured to substantially cover the upstream wall exterior surface and the downstream wall exterior surface.

In another aspect of the disclosure that may be combined with any of these aspects, the downstream wall defines an exterior surface, and in which at least one fin projects from the downstream wall exterior surface.

In another aspect of the disclosure that may be combined with any of these aspects, the injector is coupled to the downstream wall by a removable fastener.

In another aspect of the disclosure that may be combined with any of these aspects, the injector includes a plurality of feet, and the downstream wall includes a plurality of bosses, wherein each boss extends toward an associated foot, the engine exhaust assembly further including a gasket disposed between the plurality of feet and the plurality of bosses.

DETAILED DESCRIPTION

Embodiments of a mounting assembly are disclosed for use in a reductant injector for an engine aftertreatment system. In the exemplary embodiments described herein, the engine aftertreatment system includes a curved exhaust pipe in which the mounting assembly is disposed. The mounting assembly includes a recess for reducing exposure of the injector to elevated temperatures associated with the exhaust flow. The recess may be shaped to minimize recirculation flows back toward the injector, thereby to reduce or eliminate reductant deposits. Additional features are disclosed to protect the injector and related components from high temperature exposure.

Figure 1:
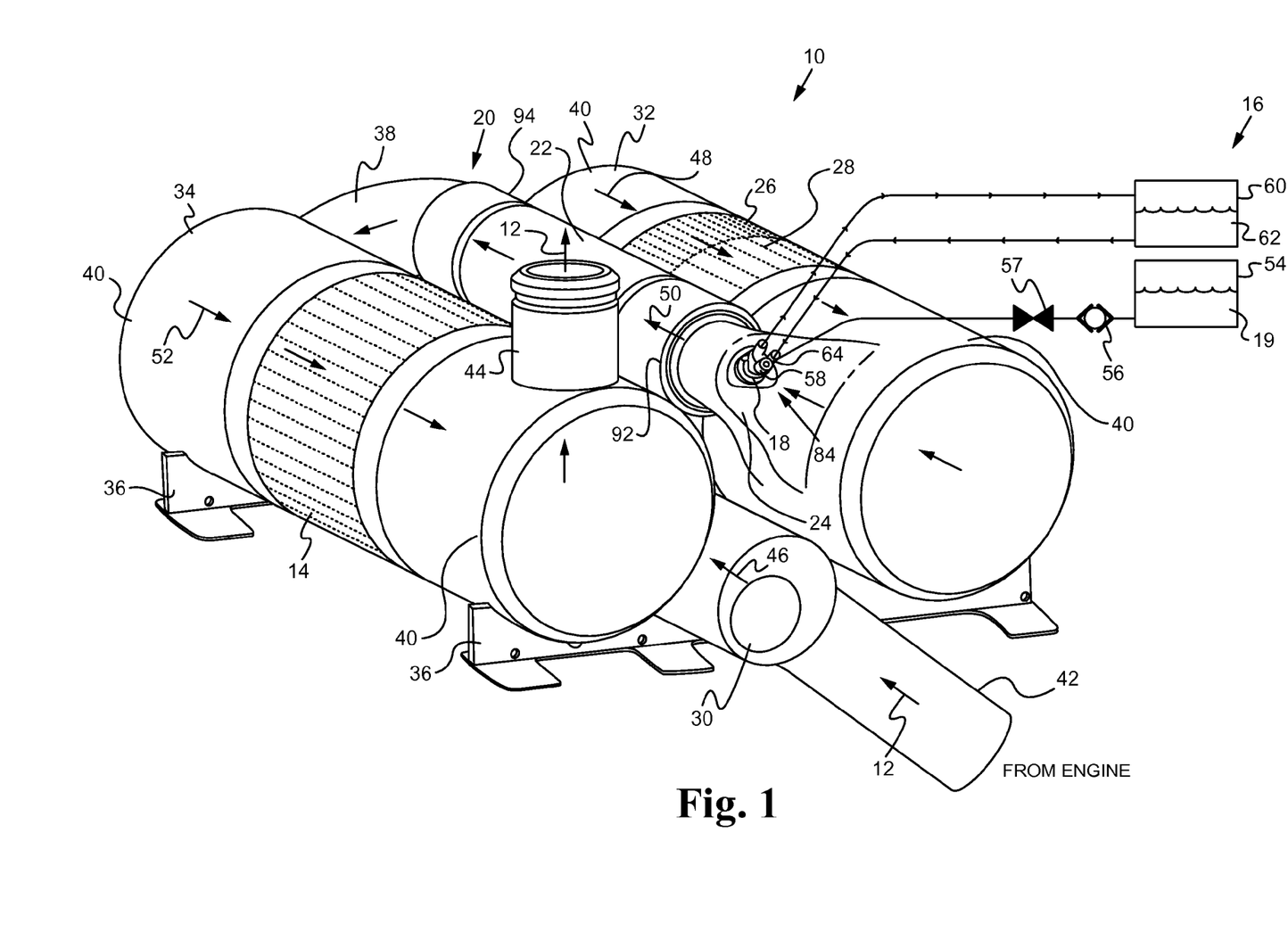
FIG. 1 is a diagrammatic view of an aftertreatment system.

In an exemplary embodiment illustrated in FIG. 1, an aftertreatment system receives an exhaust flow 12 from an engine or power system. The engine may be any type of engine (internal combustion, gas, diesel, gaseous fuel, natural gas, propane, etc.), may be of any size, with any number of cylinders, and in any configuration ("V," in-line, radial, etc.). The engine may be used to power any machine or other device, including on-highway trucks or vehicles, off-highway trucks or machines, earth moving equipment, generators, aerospace applications, locomotive applications, marine applications, pumps, stationary equipment, or other engine powered applications.

The aftertreatment system 10 includes an SCR catalyst 14 and a reductant system 16. The SCR catalyst 14 includes a catalyst material disposed on a substrate. The catalyst material is configured to reduce an amount of NOx in the exhaust flow 12 by using a reductant 19. The substrate may consist of cordierite, silicon carbide, other ceramic, or metal. The substrate may include a plurality of through going channels and may form a honeycomb structure. An ammonia oxidation catalyst (AMOX) may also be included downstream of the SCR 14 or zone coated on the end of the SCR 14.

The reductant system 16 includes an injector 18 that introduces a reductant 19 into the exhaust flow 12. The injector 18 may include springs, washers, cooling passages, injector pins, and other features not shown. While other reductants 19 are possible, urea is the most common source of reductant 19. Urea reductant 19 decomposes into ammonia (NH3) that is adsorbed or stored in the SCR catalyst 14.

The exhaust flow 12 is introduced to the SCR catalyst 14 via an exhaust pipe 20. The exhaust pipe 20 includes a straight part 22 and a curved part or bend 24 upstream of the straight part 22. The injector 18 is mounted in the bend 24. The length of the straight part 22 or distance between the injector 18 and SCR catalyst 14 may be sufficiently long to mix the reductant 19 into the exhaust flow 12 and provide a sufficient dwell time for the urea reductant 19 to convert into NH3.

The aftertreatment system 10 may also include a diesel oxidation catalyst (DOC) 26, a diesel particulate filter (DPF) 28, and a clean-up catalyst or other exhaust treatment devices upstream or downstream of the SCR catalyst 14. The currently illustrated aftertreatment system 10 shows the DOC 26 upstream of the DPF 28, which is upstream of the SCR catalyst 14.

The aftertreatment system 10 may also include a heat source 30 to regenerate the DPF 28. The heat source 30 may embody a burner including a combustion head and a housing to contain a flame. The heat source 30 may also embody an electric heating element, microwave device, or other heat source. Heat may also be created by injecting a hydrocarbon source, such as fuel, in to the exhaust flow 12 that will exothermically react in the DOC 26. The heat source 30 may also embody operating the engine under conditions to generate elevated exhaust flow 12 temperatures.

The DOC 26 and DPF 28 may be housed in a common first canister 32. The DOC 26 and DPF 28 may also be housed in separate canisters. The SCR catalyst 14 may be housed in a second canister 34. The heat source 30, first canister 32, and second canister 34 may be arranged in side-by-side parallel orientation on a mount 36. The heat source 30, first canister 32, and second canister 34 may also be arranged and mounted in other ways.

The exhaust pipe 20 may also include second bend 38 downstream of the straight part 22 for routing the exhaust flow 12 into the second canister 34. In other embodiments, the second bend 38 may not be included and the second canister 34 may be aligned with the straight part 22. The first and second canisters 32 and 34 may also include ends 40 for delivering and receiving the exhaust flow 12.

An entering pipe 42 routes the exhaust flow 12 to the aftertreatment system 10. The second canister 34, or another end canister, may include an exit port 44 for the exhaust flow 12 to exit the aftertreatment system 10.

An additional section of exhaust pipe (not shown) may route the exhaust flow 12 from the heat source 30 to the first canister 32 receiving end 40. In other embodiments, the heat source 30 may not be included and the entering pipe 42 may route the exhaust flow 12 to the first canister 32 receiving end 40.

The exhaust flow 12 passes through the entering pipe 42 and next through the heat source 30, if included, in a first direction 46. Next, the exhaust flow 12 is routed to pass through the first canister 32 in a second direction 48 that may be parallel to the first direction 46. The exhaust flow 12 passes through the DOC 26, DPF 28, end 40, and through the bend 24. Next the exhaust flow 12 passes through the straight part 22 in a third direction 50 that may be parallel to the second direction 48. Next, the exhaust flow 12 is routed to pass through the second bend 38 and through the second canister 34 in a fourth direction 52 that may be parallel to the second direction 48. Finally the exhaust flow 12 exits through the exit port 44.

The reductant system 16 may also include a reductant source 54, pump 56, and valve 57. The reductant 19 is drawn from the reductant source 54 via the pump 56 and delivered to an inlet connection 58 on the injector 18. The valve 57 or pump 56 may be used to control the delivery of the reductant 19. A controller and sensors may also be included to control the reductant system 16. The controller and sensors may also control the heat source 30. The controller may also be in communication with an engine control module (ECM) or may be included in the ECM.

The reductant system 16 may also include a coolant source 60 that delivers coolant 62 to the injector 18 via coolant port connections 64. The coolant source 60 may embody the engine's coolant system or another coolant source 60. The coolant 62 may also be used to cool other parts of the reductant system 16 or aftertreatment system 10. The coolant 62 may also be used to thaw frozen urea 19.

Figure 4:
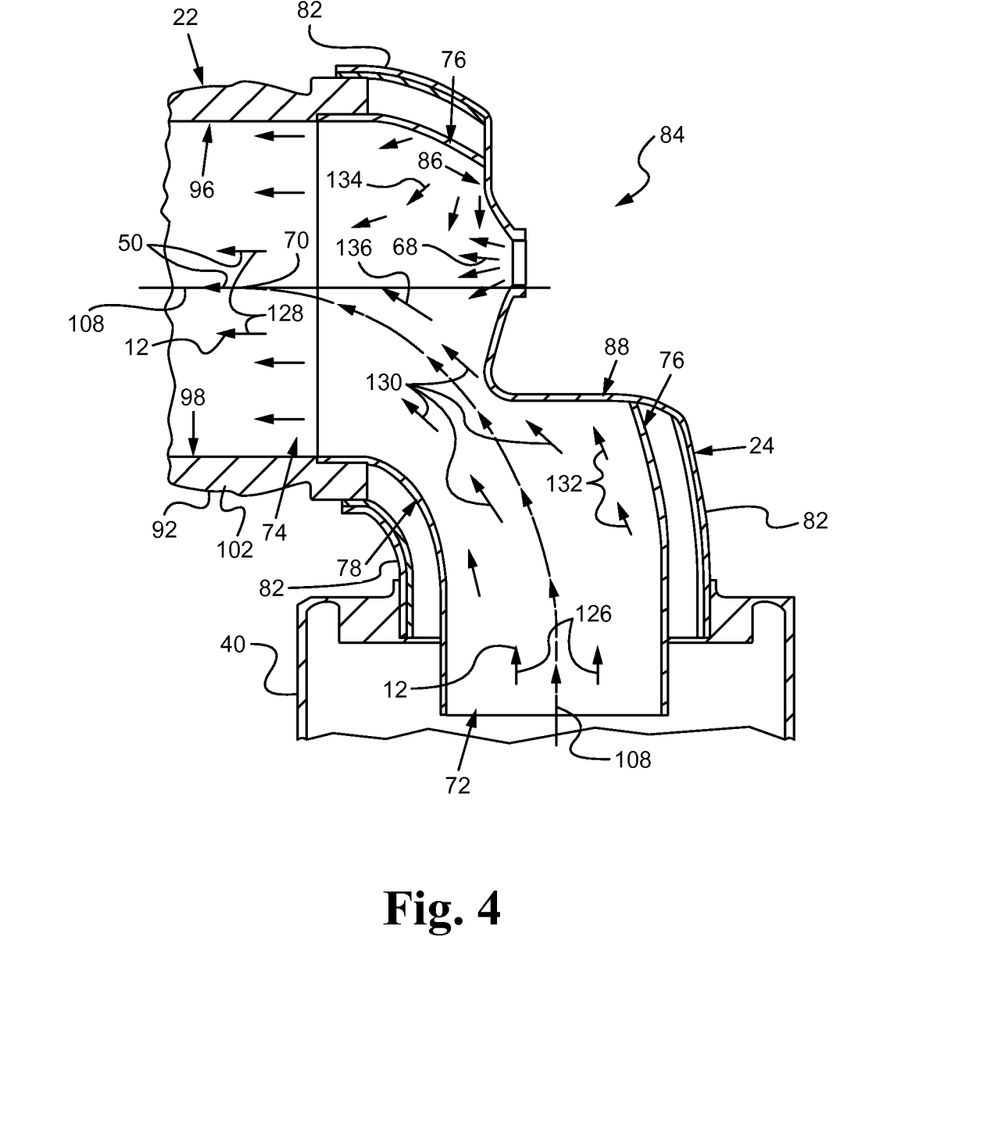
FIG. 4 is a side elevation view, in cross-section, of the curved exhaust pipe of FIG. 2 showing an exhaust flow and a spray of reductant.

As best shown in FIG. 4, the injector 18 discharges a spray 68 of reductant 19 into the exhaust flow 12. The spray 68 may define an axis of symmetry 70. Absent any influence by the exhaust flow 12, the axis of symmetry 70 may be substantially parallel to the third direction 50.

Figure 2:
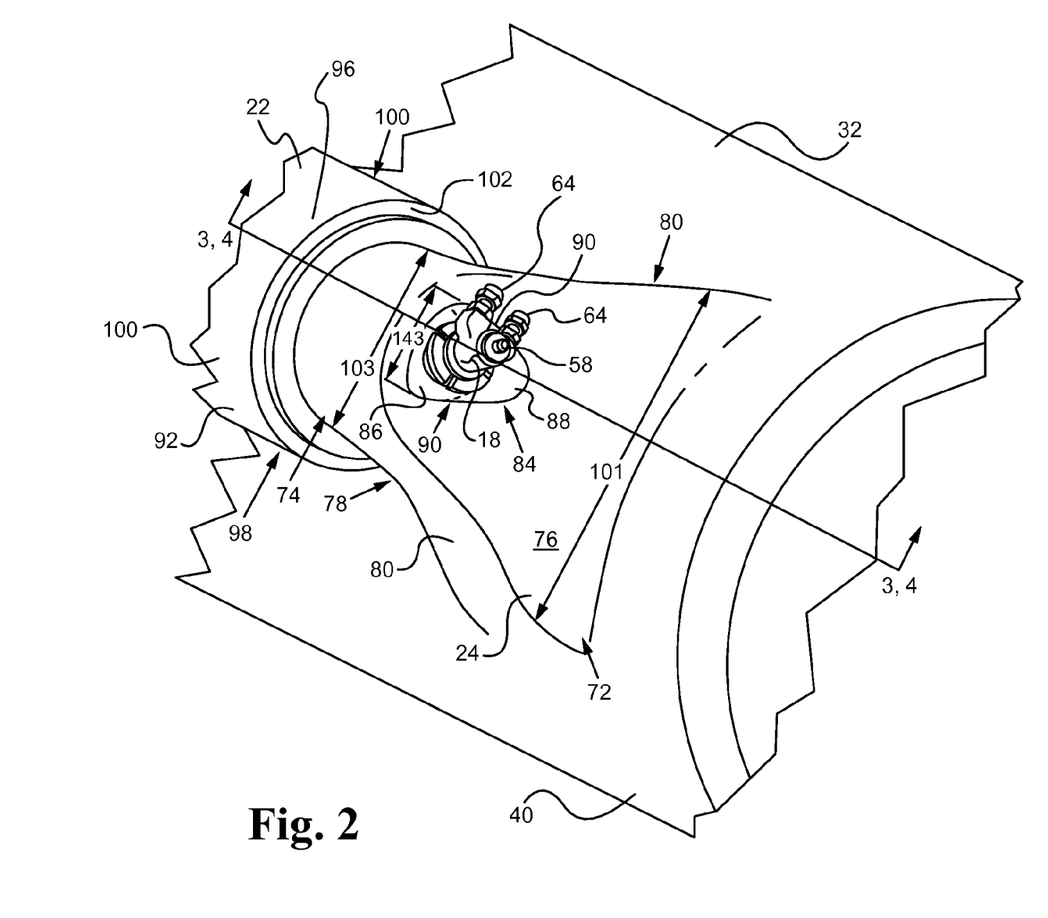
FIG. 2 is an enlarged diagrammatic view of a curved exhaust pipe used in the aftertreatment system of FIG. 1.
Figure 3:
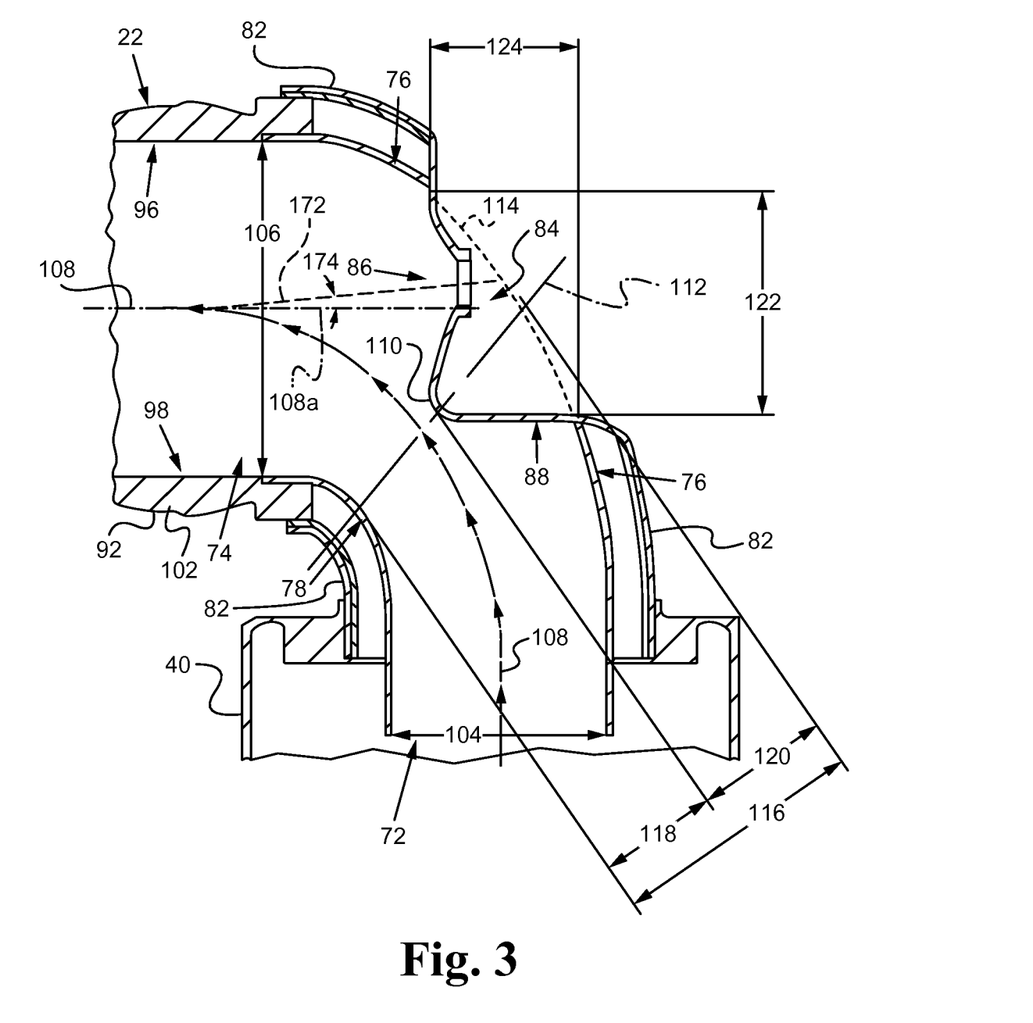
FIG. 3 is a side elevation view, in cross-section, of the curved exhaust pipe of FIG. 2.

As best shown in FIG. 2, the bend 24 includes a bend inlet end 72, bend outlet end 74, bend outer curve 76, bend inner curve 78, and bend sides 80. The bend outer curve 76, bend inner curve 78, and bend sides 80 form a bent tube or box structure with an open bend inlet end 72 and bend outlet end 74. The bend inlet end 72 joins to and is in fluid communication with the end 40 of first canister 32. The bend outlet end 74 joins to and is in fluid communication with the straight part 22. The bend outer curve 76, bend inner curve 78, and bend sides 80 represent walls exposed to the exhaust flow 12. As seen in FIGS. 3 and 4, bend 24 may also include double walls 82 outside of these walls. The double walls 82 provide thermal protection from the exhaust flow 12.

An injector mounting assembly 84, such as an indentation, is included in the bend outer curve 76. The injector mounting assembly 84 is defined by or includes a downstream wall 86, an upstream wall 88, and sidewalls 90, which together form a recessed pocket or area in the bend 24. The injector mounting assembly 84 may have rounded triangular shape with a width at the upstream end greater than a width at the downstream end. The injector mounting assembly 84 may also have other shapes, including rectangular, cylindrical, or hemispherical.

The straight part 22 includes an upstream end 92, downstream end 94, outer wall 96, inner wall 98, and sides 100 to form a tubular pipe. Straight part 22, and other components, may be wrapped in insulation 102. The upstream end 92 joins to the bend outlet end 74.

Dimensional aspects of the bend 24 and injector mounting assembly 84 are seen best FIGS. 2 and 3. FIG. 2 shows the bend 24 has an inlet width 101 and an outlet width 103. The width of the bend 24 may decrease from the bend inlet end 72 to bend outlet end 74 resulting in a smaller outlet width 103 than inlet width 101. As seen in FIG. 3, the bend 24 has an inlet depth 104 and an outlet depth 106. The depth of the bend 24 may increase gradually from the bend inlet end 72 to bend outlet end 74 resulting in a larger outlet depth 106 than inlet depth 104. Because the relative sizes of the inlet width 101 to outlet width 103 and inlet depth 104 to outlet depth 106 vary in opposite relation, a substantially constant flow area may be maintained. In other embodiments, the width and depth of bend 24 may be constant or vary differently. The outlet depth 106 and outlet width 103 may substantially match the width or diameter of the straight part 22.

A centerline 108, shown in FIG. 3, extends through the center of the bend 24 and may continue through the straight part 22. The injector mounting assembly 84 extends into the bend 24 and includes a maximum bend extension point 110. The maximum bend extension point 110 may be a point or line where the downstream wall 86 and upstream wall 88 meet. A bend central plane 112 extends through the maximum bend extension point 110 and is normal to the centerline 108. A projected outer curve 114 extends in space over the injector mounting assembly 84 along the same curvature as the bend outer curve 76. A projected center depth 116 represents a central depth of the bend 24 if the injector mounting assembly 84 was not present. This projected center depth 116 is the depth of the bend 24 along the bend central plane 112 from the inner curve 78, through the maximum bend extension point 110 to the projected outer curve 114.

A minimum center depth 118 represents a central depth of the bend 24 where it is the smallest because of the injector mounting assembly 84. This minimum center depth 118 is the depth of the bend 24 along the bend central plane 112 from the bend inner curve 78 to the maximum bend extension point 110. An indentation maximum extension length 120 represents the maximum depth of the injector mounting assembly 84. This indentation maximum extension length 120 is the length along the bend central plane 112 from the maximum bend extension point 110 to the projected outer curve 114.

The injector mounting assembly 84 has a downstream wall length 122 and upstream wall length 124. The downstream wall length 122 is the length extending along the downstream wall 86 from the outer curve 76 to the maximum bend extension point 110. The upstream wall length 124 is the length extending along the upstream wall 88 from the outer curve 76 to the maximum bend extension point 110. Although many of the dimensions above are referred to as minimums and maximums, projections and other additional structures should not be considered as included in these dimensions.

FIG. 4 shows the direction of the exhaust flow 12 as it travels through the bend 24 into the straight part 22. The direction of flow includes a straight inlet direction 126, straight outlet direction 128, and a central curved direction 130 between the straight inlet direction 126 and straight outlet direction 128. Also included are blocked flows 132 under the upstream wall 88 of the injector mounting assembly 84. Dead flows 134 also exist downstream of the downstream wall 86 and in the corner where the downstream wall 86 meets the outer curve 76.

The injector 18 may be mounted in the downstream wall 86 so that the reductant spray 68 is aligned with the axis of symmetry 70 and the centerline 108 as it extends in the straight part 22. The injector mounting assembly 84 may also be sized to locate the axis of symmetry 70 to intersect with an intermediate direction 136 of the exhaust flow 12. The intermediate direction 136 is the direction of exhaust flow 12 as it begins to straighten into the straight outlet direction 128 from the central curved direction 130. The intermediate direction 136 is the first exhaust flow 12 to intersect the axis of symmetry 70 that is not blocked by the upstream wall 88.

Figure 5:
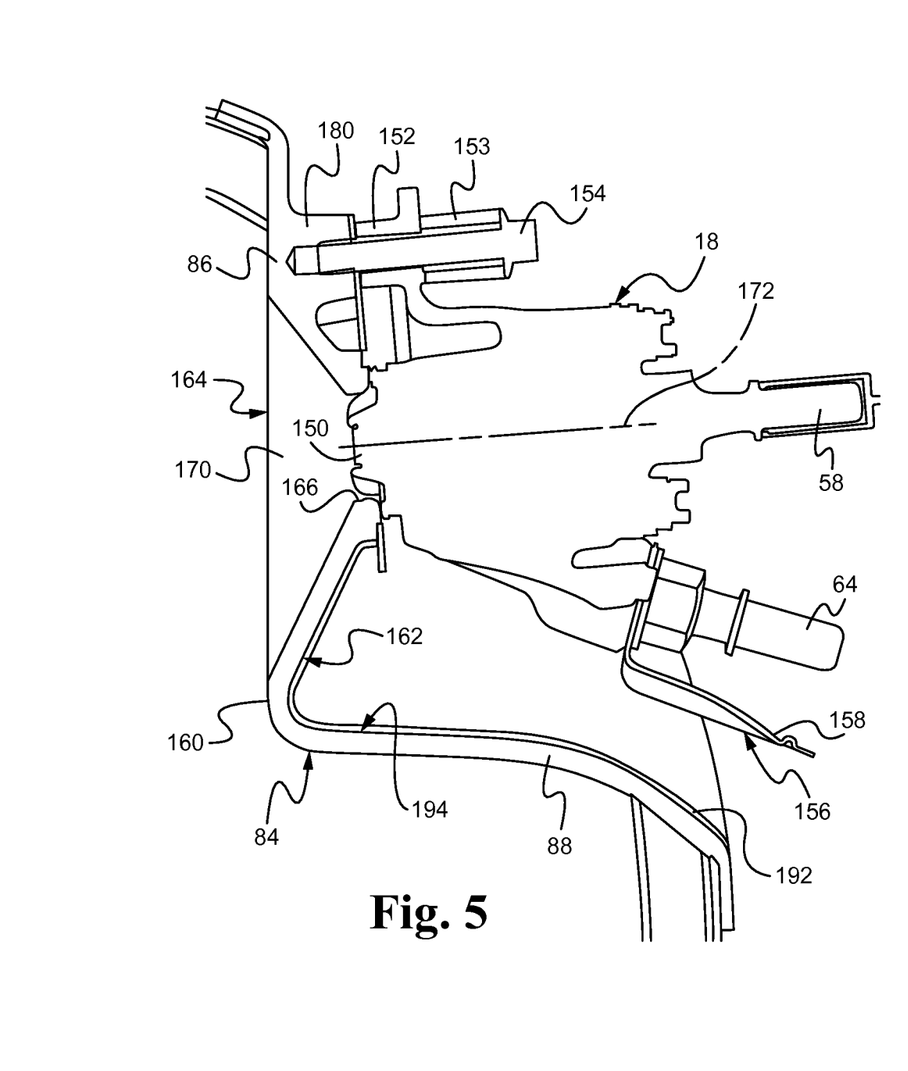
FIG. 5 is an enlarged side elevation view, in cross-section, of an injector coupled to an injector mounting assembly provided in the curved exhaust pipe.
Figure 6:
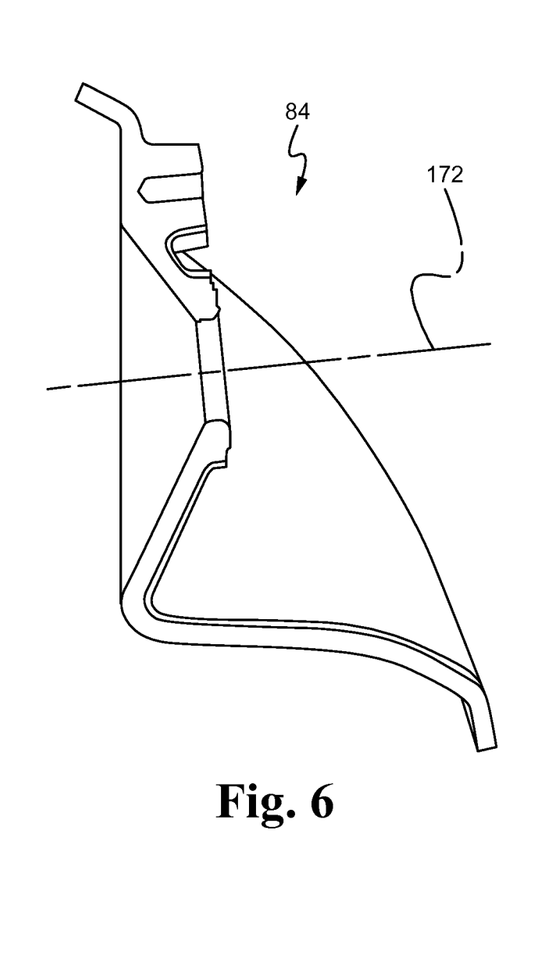
FIG. 6 is an enlarged side elevation view, in cross-section, of the injector mounting assembly of FIG. 5.
Figure 7:
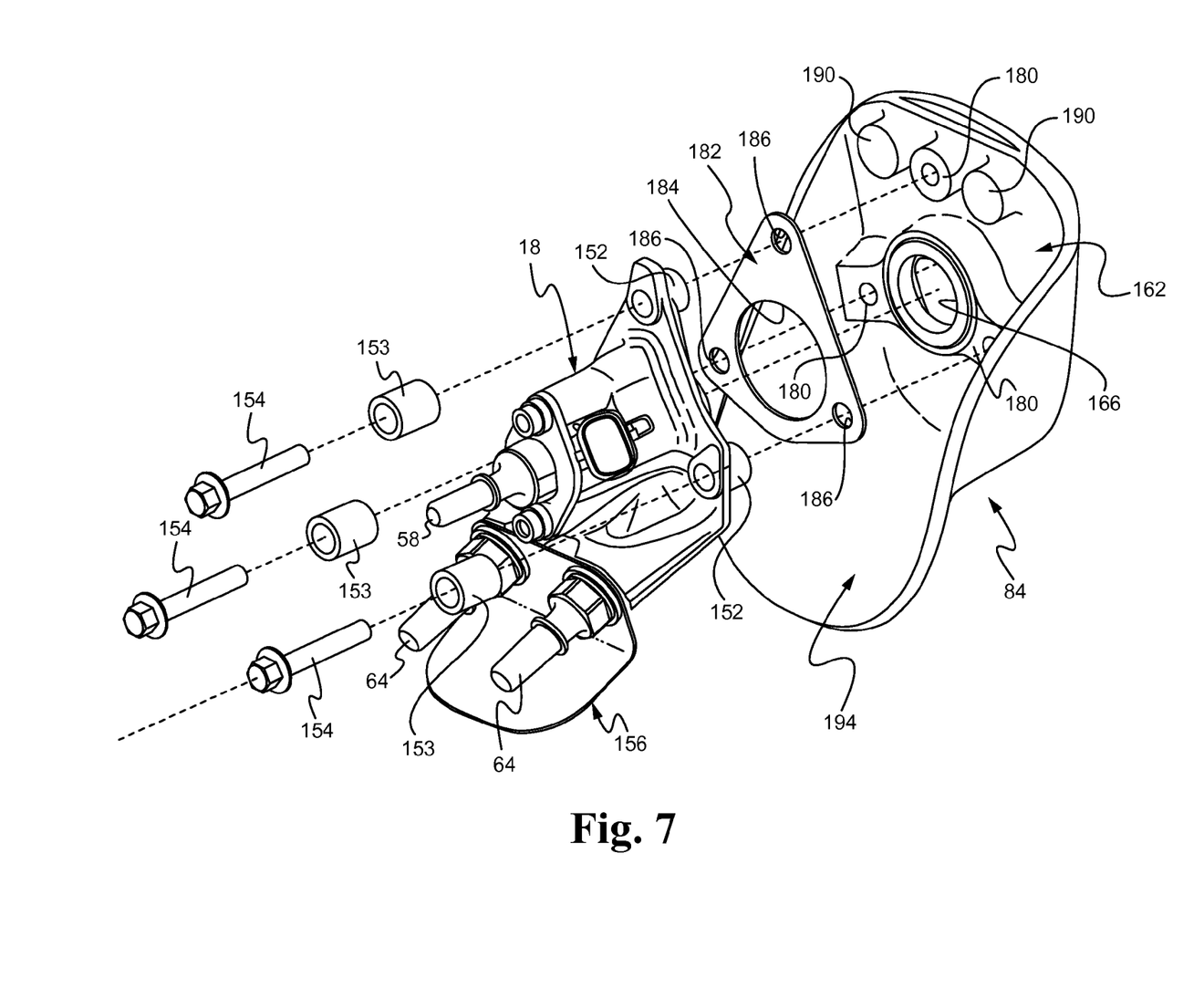
FIG. 7 is an exploded view of the injector and injector mounting assembly of FIG. 5.

As best shown in FIGS. 5 and 7, a front end of the injector 18 may include a nozzle 150 for discharging reductant. The front end of the injector 18 may further include a plurality of feet 152 which permit the injector 18 to be removably coupled to the injector mounting assembly 84 using washers 153 and fasteners 154. The feet 152 may terminate at a plane that is positioned adjacent the nozzle 150. The reductant inlet connection 58 is positioned opposite the nozzle 150 at a back end of the injector 18. The back end of the injector 18 may also include the coolant port connections 64. A heat shield 156 is coupled to the injector and includes a bottom arm 158 that extends beneath the coolant port connections 64.

The injector mounting assembly 84 may be configured to protect the injector 18 from the high temperature exhaust flow while minimizing recirculation flow, thereby to prevent deposits of reductant from forming. As best shown in FIGS. 5-8, the downstream wall 86 includes an interior surface 160 facing toward the bend outlet end 74 and an opposite exterior surface 162. A recess 164 is formed in the downstream wall 86 that extends away from the bend outlet end 74, and an aperture 166 is formed in a center of the recess 164 for fluid communication with the injector nozzle 150.

Figure 8:
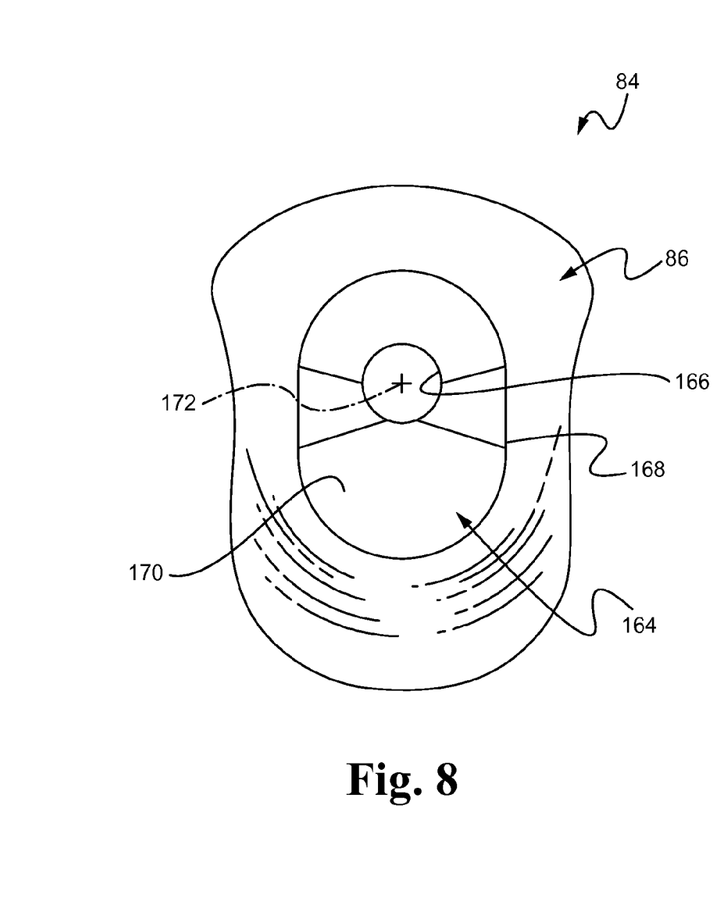
FIG. 8 is a front view of the injector mounting assembly of FIG. 5.

In the exemplary embodiment, the recess 164 is shaped to reduce recirculation flow. As best shown in FIG. 8, the recess 164 has an outer periphery 168 with a substantially obround shape, however other periphery shapes may be used. A recess wall 170, therefore, may have a generally frustoconical shape extending around a centerline 172 of the aperture 166. The recess wall 170 is further configured and oriented to reduce recirculation flow.

The exterior surface 162 of the injector mounting assembly 84 may include a plurality of mounting bosses 180 positioned to abut the feet 152 of the injector 18. An optional gasket 182 may be disposed between the feet 152 and the mounting bosses 180 to further insulate the injector 18 from heat when coupled to the injector mounting assembly 84. As best shown in FIG. 7, the gasket 182 may include a gasket aperture 184 substantially aligned with the recess aperture 166 and a plurality of fastener apertures 186 sized to receive the fasteners 154. The gasket 182 may be formed of a material having a low heat conductivity, such as vermiculite.

Anchor bosses 190 may also project from the exterior surface 162 to provide structure for securing a layer of insulation 192 over the exterior surface 162 of the downstream wall 86 as well as an exterior surface 194 of the upstream wall 88. The layer of insulation 192 may be formed of a thermal insulating material, such as a silicate fiber mat encased with a stainless steel foil.

The aperture 166, and therefore the injector nozzle 150, may be positioned and oriented to promote mixing of the reductant with the exhaust flow 12 as it traverses the straight part 22. In the illustrated embodiment, for example, the center of the aperture 166 is positioned above the straight part portion of the centerline 108, as best shown with the centerline extension 108a shown in FIG. 3. Additionally, the aperture 166 is oriented so that the aperture centerline 172 forms an angle 174 with respect to the straight part portion of the centerline 108. For example, the center of the aperture 166 may be approximately 10 millimeters above the centerline extension 108a, and the aperture centerline 172 may extend at an angle of approximately 5° with respect to the straight part portion of the centerline 108. When the aperture 166 is positioned and oriented in this manner, the spray of reductant will be better centered in the straight part 22, thereby increasing mixing of reductant and exhaust flow.

Figure 9:
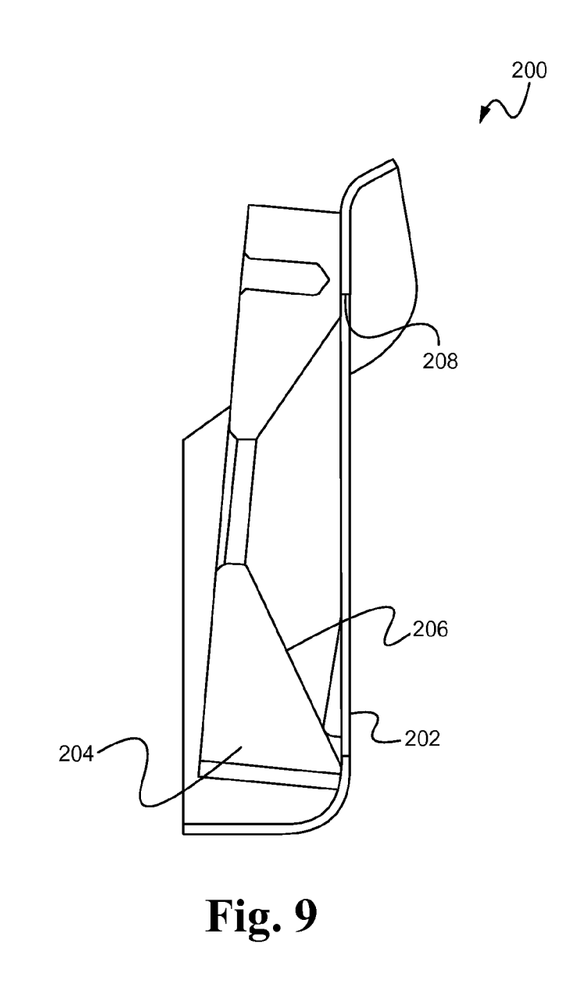
FIG. 9 is a side elevation view, in cross-section, of an alternative embodiment of an injector mounting assembly.

In an alternative embodiment illustrated in FIG. 9, an injector mounting assembly 200 includes an indentation plate 202 and a separate adapter 204. The adapter 204 may be coupled, such as by welding, to the indentation plate 202. The adapter 204 defines a recess 206 similar to the recess 164 described above. The recess 206 fluidly communicates through an opening 208 formed in the indentation plate 202.

Figure 10:
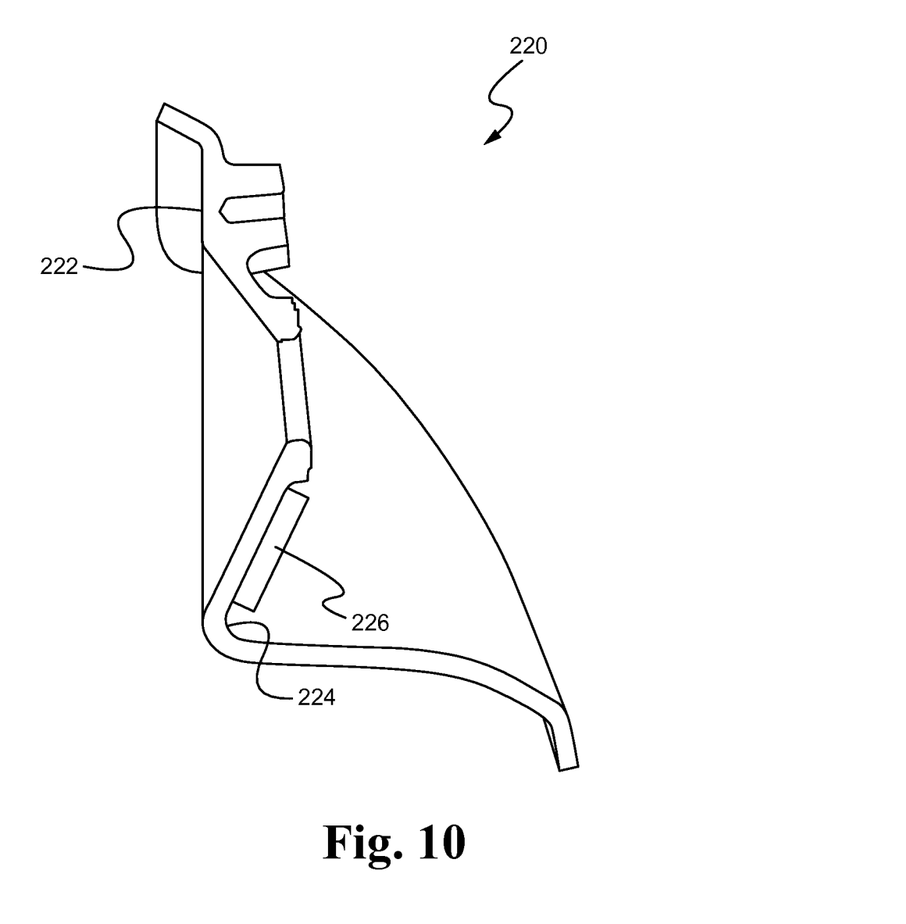
FIG. 10 is a side elevation view, in cross-section, of a further alternative embodiment of an injector mounting assembly.

In a further alternative embodiment illustrated in FIG. 10, an injector mounting assembly 220 is modified to direct heat away from the injector 18 from high temperatures. Specifically, the injector mounting assembly includes a downstream wall 222 having an exterior surface 224 formed with at least one fin 226. Heat will flow to the additional mass provided by the fin 226, thereby directing heat away from the injector 18.

INDUSTRIAL APPLICABILITY

Reductant sprays 68 often form deposits in the aftertreatment system 10. The deposits may form under a number of different conditions and through a number of different mechanisms. Deposits may form when the urea reductant 19 is not quickly decomposed into $NH_3$ and thick layers of urea reductant 19 collect. These layers may build as more and more urea reductant 19 is sprayed or collected, which may have a cooling effect that prevents decomposition into NH3. As a result, the urea reductant 19 sublimates into crystals or otherwise transforms into a solid composition to form the deposit. This composition may consist of biuret ($NH_2CONHCONH_2$) or cyanuric acid (($NHCO)^3$) or another composition depending on temperatures and other conditions.

While the reductant system 16 may or may not be air-assisted, deposits more readily develop in airless reductant systems 16. Airless reductant systems 16 tend to produce reductant sprays 68 with larger droplet sizes than air-assisted reductant systems 16. The larger droplet size in the reductant spray 68 may cause deposit formations. In general, these deposits may form on surfaces of the aftertreatment system 10 where the reductant spray 68 impinges, recirculates, or settles. For example, the deposits may form on the outer wall 96 or around the outlet 66.

These deposits may have negative impacts on the operation of the system. The deposits may block the exhaust flow 12, causing higher back-pressure and reducing engine and aftertreatment system 10 performance and efficiency. The deposits may also disrupt the flow and mixing of the urea reductant 19 into the exhaust flow 12, thereby reducing the decomposition into NH3 and reducing NOx reduction efficiency. The deposits may also block the injector or disrupt the reductant spray 68. The formation of the deposits also consumes urea reductant 19, making control of injection harder and potentially reducing NOx reduction efficiency in the SCR 14. The deposits may also corrode components of the aftertreatment system 10 and degrade the structural and thermal properties of the SCR catalyst 14. The deposits may also block channels of the SCR catalyst 14, again reducing NOx reduction efficiency.

The injector mounting assembly 84 may help prevent overheating of the injector tip by removing the injector 18 from direct contact with the exhaust flow while configuring the recess 164 to reduce or eliminate recirculation flow back toward the injector nozzle 150. The recess 164 moves the injector 18 by a recess distance, such as approximately 12-25 millimeters, thereby to reduce the heat to the injector tip due to direct exposure of the injector to the high temperature exhaust flow. Additionally, the recess 164 is configured and oriented to minimize recirculation flow and the reductant deposits associated therewith. Additional measures, such as the layer of insulation 192 and gasket 182 provide additional thermal insulation to the injector 18.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An injector mounting assembly for use with an injector having a plurality of feet and configured for mounting in a curved portion of an exhaust line having an exhaust flow from an upstream end to a downstream end, the injector mounting assembly comprising:
    an upstream wall extending at least partially into the exhaust line curved portion and disposed in the exhaust flow;
    a downstream wall coupled to and located downstream of the upstream wall, the downstream wall extending at least partially into the exhaust line curved portion and disposed in the exhaust flow, the downstream wall having an interior surface facing the exhaust line downstream end, the downstream wall including a plurality of bosses, wherein each of the plurality of bosses extends toward an associated one of the plurality of feet;
    a recess extending from the downstream wall in a direction away from the exhaust line downstream end; and
    a recess aperture formed in the recess and configured to fluidly communicate with the injector.

2. The injector mounting assembly of claim 1, in which the recess includes an outer periphery having an obround shape.

3. The injector mounting assembly of claim 1, in which the exhaust line further includes a straight portion coupled to the curved portion downstream end and defining a straight portion centerline, and in which the recess aperture defines a recess centerline oriented at an angle relative to the straight portion centerline.

4. The injector mounting assembly of claim 1, in which the upstream wall defines an exterior surface and the downstream wall defines an exterior surface, the injector mounting assembly further including a layer of insulation covering at least portions of the upstream wall exterior surface and the downstream wall exterior surface.

5. The injector mounting assembly of claim 1, in which the downstream wall defines an exterior surface, and in which at least one fin projects from the downstream wall exterior surface.

6. The injector mounting assembly of claim 1, further including a gasket disposed between the plurality of feet and the plurality of bosses.

7. The injector mounting assembly of claim 6, in which the gasket includes a fastener aperture for each injector foot and a gasket aperture aligned with the recess aperture.

8. An engine exhaust assembly comprising:
    a curved exhaust line having an exhaust flow from an upstream end to a downstream end;
    a mounting assembly having:
        an upstream wall extending at least partially into the exhaust line and disposed in the exhaust flow;
        a downstream wall coupled to and located downstream of the upstream wall, the downstream wall extending at least partially into the exhaust line and disposed in the exhaust flow, the downstream wall having an interior surface facing the exhaust line downstream end and an exterior surface facing away from the exhaust line downstream end, the downstream wall including a plurality of bosses;
        a recess extending from the downstream wall in a direction away from the exhaust line downstream end; and
        a recess aperture formed in the recess; and
    an injector coupled to the downstream wall exterior surface and having a nozzle aligned with the recess aperture, the injector including a plurality of feet, wherein each of the plurality of bosses extends toward an associated one of the plurality of feet.

9. The engine exhaust assembly of claim 8, in which the recess includes an outer periphery having an obround shape.

10. The engine exhaust assembly of claim 8, further comprising a straight exhaust line coupled to the curved exhaust line downstream end and defining a straight exhaust line centerline, and in which the recess aperture defines a recess centerline oriented at an angle relative to the straight exhaust line centerline.

11. The engine exhaust assembly of claim 8, in which the upstream wall defines an exterior surface, the mounting assembly further including a layer of insulation covering at least portions of the upstream wall exterior surface and the downstream wall exterior surface.

12. The engine exhaust assembly of claim 8, in which the injector is coupled to the downstream wall by a removable fastener.

13. The engine exhaust assembly of claim 8, further including a gasket disposed between the plurality of feet and the plurality of bosses.

14. The engine exhaust assembly of claim 13, in which the gasket includes a fastener aperture for each injector foot and a gasket aperture aligned with the recess aperture.

15. An engine exhaust assembly comprising:
    a curved exhaust line having an exhaust flow from an upstream end to a downstream end;
    an indentation having:
        an upstream wall extending at least partially into the curved exhaust line and disposed in the exhaust flow;
        a downstream wall formed integrally with and located downstream of the upstream wall, the downstream wall extending at least partially into the curved exhaust line and disposed in the exhaust flow, the downstream wall having an interior surface facing the exhaust line downstream end and an exterior surface facing away from the exhaust line downstream end, the downstream wall including a plurality of bosses;
        a recess formed integrally with the downstream wall and extending from the downstream wall in a direction away from the exhaust line downstream end; and
        a recess aperture formed in the recess; and
    an injector coupled to the downstream wall exterior surface and having a nozzle aligned with the recess aperture, the injector including a plurality of feet, wherein each of the plurality of bosses extends toward an associated one of the plurality of feet.

16. The engine exhaust assembly of claim 15, in which the engine exhaust assembly further includes a gasket disposed between the plurality of feet and the plurality of bosses.

17. The engine exhaust assembly of claim 15, in which the upstream wall defines an exterior surface, the engine exhaust assembly further including a layer of insulation covering at least portions of the upstream wall exterior surface and the downstream wall exterior surface.

18. The engine exhaust assembly of claim 15, further comprising a straight exhaust line coupled to the curved exhaust line downstream end and defining a straight exhaust line centerline, and in which the recess aperture defines a recess centerline oriented at an angle relative to the straight exhaust line centerline.

* * * * *